UNITED STATES PATENT OFFICE.

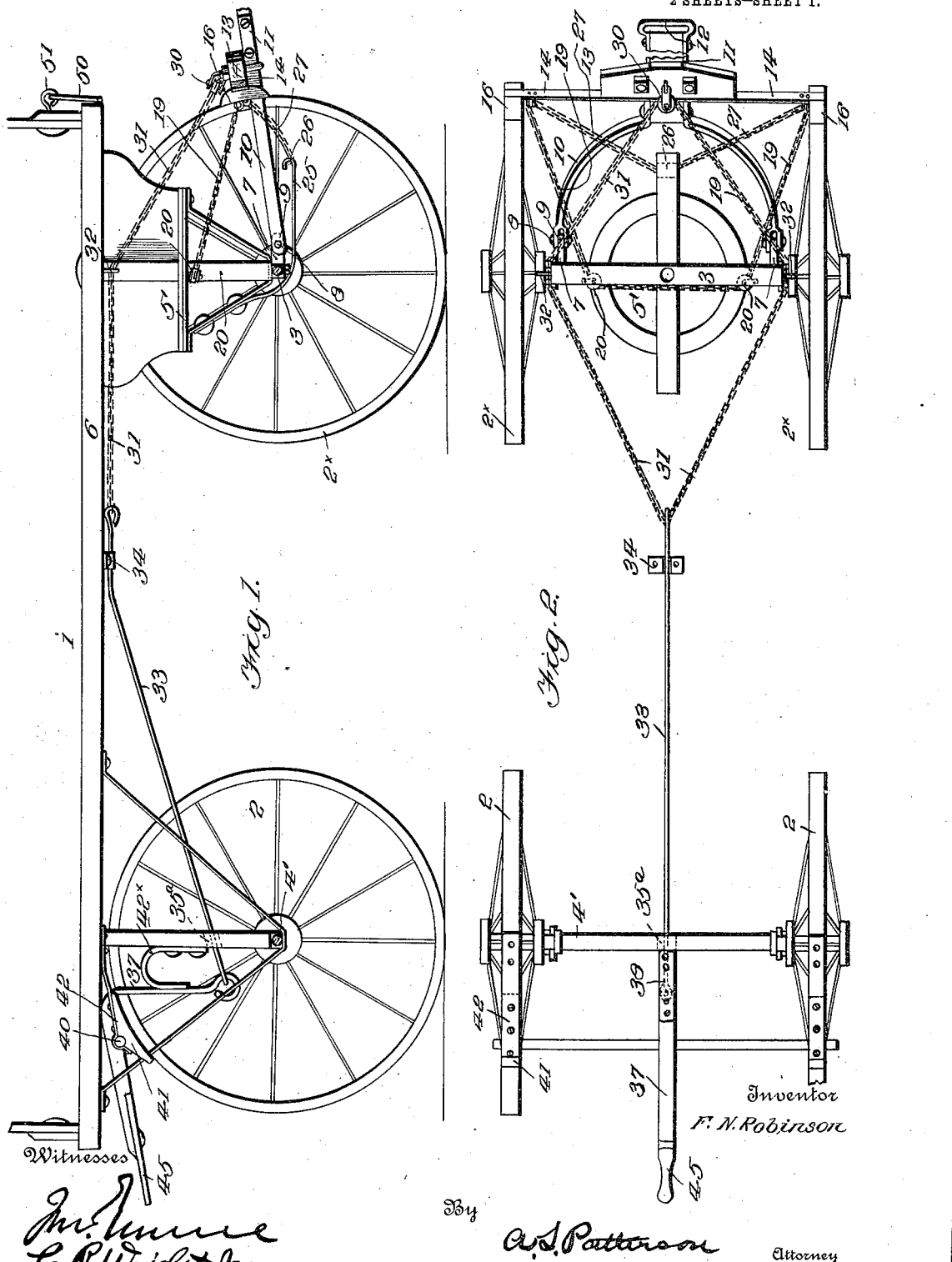

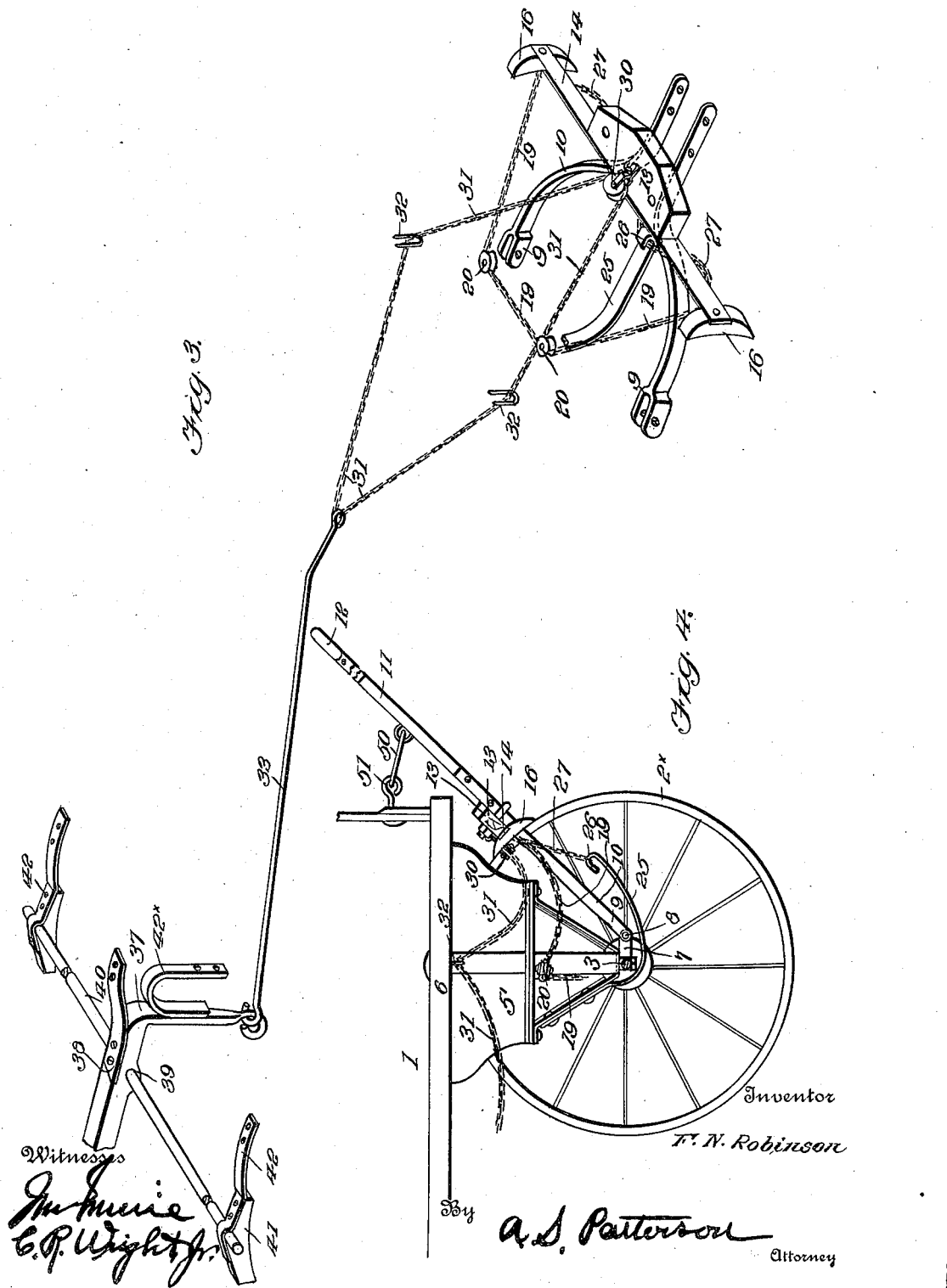

FRANK N. ROBINSON, OF WAYLAND, NEW YORK.

BRAKE.

1,015,078.  Specification of Letters Patent.  Patented Jan. 16, 1912.

Application filed July 24, 1911. Serial No. 640,302.

*To all whom it may concern:*

Be it known that I, FRANK N. ROBINSON, a citizen of the United States, residing at Wayland, in the county of Steuben and State of New York, have invented certain new and useful Improvements in Brakes, of which the following is a specification, reference being had therein to the accompanying drawing.

This invention relates to improvements in brakes designed primarily for hand-trucks.

The object of the invention is to provide convenient and economical means for applying the brakes to the wheels of a truck by raising or lowering the handle.

A further object of the invention is to provide means associated with the handle of a truck, whereby when the operator releases hold on the handle, the weight of the latter will apply the brakes to the wheels and hold the truck in position against movement by an accidental knock, or the effect of the wind.

The invention also relates to improvements in the details of construction and arrangement of parts which will be hereinafter described and particularly pointed out in the claims.

In the drawings: Figure 1 is a side elevation of a truck, illustrating the application of my invention. Fig. 2 is a top plan view, the platform of the truck being removed. Fig. 3 is a detached perspective view of the braking mechanism. Fig. 4 is a side elevation of the front portion of a truck but illustrating the position of the parts when the brake is applied by elevating the handle.

The numeral 1, indicates a truck including the wheels 2 and 2ˣ, front and rear axles, 3 and 4', running gear 5', and platform 6. Projecting from the front axle 3, are two ears 7, and pivotally connected thereto by pins 8, are the bifurcated ends 9 of hounds 10. To the front of the hounds is secured a handle 11, at the free end of which is a hand grip 12. Permanently secured to the upper side of the handle is a cross bar 13, to the rear edge of which is fastened a flat leaf spring 14, the ends thereof extending laterally and terminating in a plane with the outer edges of the front wheels of the truck. To the ends of the flat leaf spring are fastened brake shoes 16—16, adapted to engage the peripheries of the front wheels. It will be observed that the shoes are located just above the horizontal plane of the center of the front wheels so as to frictionally engage the latter when the handle is depressed, either by its own weight, or by pressure exerted by the operator. This position of the brake shoes, coupled with the location of the pivot pins 8, will cause a yielding but binding action on the wheels and effectually serve to hold the truck against movement. A cable 19, is secured to the opposite ends of the flat leaf spring 14. This cable passes around rollers 20, whereby to equalize the pressure of the brake shoes when applying the front brakes. The rollers 20, are slightly above the horizontal plane of the attaching points of the opposite ends of the cable to the flat leaf spring, so as to exert a rearward pull to apply the shoes when the handle is lowered.

Fastened to the running gear 5', and extending under the front axle 3, and forwardly therefrom is a flat leaf spring 25, formed at its free end with an eye 26. Attached to the rear side of the flat leaf spring 14, and near the ends thereof is a cable 27, which extends rearwardly and through the eye 26, in the forwardly projecting flat leaf spring 25. The eye 26, is positioned below the point of attachment of the cable 27, so that when the handle 11, is elevated, the flat leaf spring 14, will be drawn rearwardly and apply the brake shoes to the front wheels. By this construction, a double yielding action takes place, *i. e.*, the flat leaf springs 14 and 25, so that when the attendant lifts the handle with unusual force liability of breaking of the parts is reduced to a minimum.

A swiveled pulley 30, is mounted on the cross bar 13, and passing around this pulley is a cable 31. The cable extends up under the platform 6, and passes through guides 32, and thence rearwardly, where it connects with a pull rod 33. The pull rod 33, is mounted in a forward guide 34, secured to the underside of the platform, and a guide opening 35ª, formed in the rear bolster of the truck. The rear end of the pull rod 33, is pivoted to the vertical member of a bell crank lever 37, hinged at 38, to the underside of the platform. The bell crank lever is formed with an opening 39, in rear of the pivoted point, through which extends a cross bar 40, on the free ends of which are brake shoes 41, for the rear wheels. The brake shoes 41, are secured to flat leaf springs 42, fastened to the underside of the platform, and are tensioned to normally remove the shoes from contact with the peripheries of the rear wheels. A leaf spring 42× is interposed between the bell crank lever and the rear bolster to return the parts to normal position.

A hand lever 45 is pivoted to the horizontal member of the bell crank lever 37. When not in use, this lever is turned on its pivot, so as to position it under the platform and out of the way. But if an attendant in the rear of the truck desires to apply the brakes, from the rear, the handle will be turned to bring it in alinement with the horizontal member of the bell crank lever, whereby the leverage is increased and the brakes may applied with little effort.

In operation, the attendant may depress the handle 11, and by reason of the location of the pivots 8, the front shoes will be moved toward the peripheries of the front wheels. In addition to this action the cable 19, exerts a pull on the flat leaf spring 14, which quickly draws the shoes into contact with the wheels and applies the brakes. Obviously the pull on the cable pulls against the normal tension of the flat spring, so that immediately the handle 11, is raised, the flat spring will return to its normal position and automatically remove the shoes from contact with the wheels. Under ordinary circumstances, the weight of the handle and the hand grip will effect a binding action of the brake shoes on the wheels so that once the truck is located it cannot be moved without releasing the brakes. When the handle is lowered, it pulls on the cable 31, hence the pull rod 33, which through the medium of the bell crank lever 37, depresses the rear brake shoes 41, and they frictionally engage the peripheries of the rear wheels. This action of course occurs simultaneously with the application of the brakes on the front wheels. If the attendant finds it more convenient to apply the brakes by elevating the handle 11, as for instance when backing the truck, the handle is raised, and the flat leaf spring is pulled rearwardly by the pull of the cables 27. The action of the cables 27, is exactly the same as that previously described in connection with the cables, except that the flat leaf spring will yield when excess pressure is applied in the braking action, or when raising the handle to lock it to the truck in elevated position, by the hook and eye 50 and 51.

The invention is extremely simple in construction, and by the peculiar arrangement of the parts will not become out of order.

What I claim is:

1. In combination, a truck including wheels, running gear and a pivoted handle, a flat leaf spring secured to the handle, shoes at or near the ends of the flat leaf spring to engage the peripheries of the front wheels of the truck, cables connecting the flat leaf spring to the running gear, one of the cables extending rearwardly and upwardly above the plane of the point of attachment to the flat leaf spring, the other cables being secured at their rear ends below the point of attachment to the flat leaf spring, whereby when the handle is raised the cables will pull the shoes into contact with the wheels, and whereby when the handle is lowered the other cable will pull the shoes into contact with said wheels.

2. In combination, a truck including wheels, running gear, and a pivoted handle, a flat leaf spring secured to the handle, shoes at or near the ends of the flat leaf spring to engage the peripheries of the front wheels of the truck, a cable connecting the flat leaf spring to the running gear, guides for said cable, said guides being in a different horizontal plane than the point of attachment of the front ends of the cable to the flat leaf spring.

3. In combination, a truck including wheels, running gear, and a pivoted handle, a flat leaf spring secured to the handle, shoes at or near the ends of the flat leaf spring to engage the peripheries of the front wheels of the truck, cables connecting the flat leaf spring to the running gear, certain of said cables extending rearwardly and below the plane of the flat leaf springs, a flat spring to which said cable is attached, the other cable extending upwardly and rearwardly of said flat leaf spring, guides for the latter cable, said guides secured to the running gear, whereby when the handle is raised or lowered the brake shoes will be applied.

4. In combination, a truck including a platform, front and rear wheels, running gear, and a pivoted handle, a transversely mounted flat leaf spring secured to the pivoted handle, shoes on the ends of the flat leaf spring, a flexible connection between the flat leaf spring and the running gear, shoes for the rear wheels, yielding supports for the shoes for the rear wheels, a bell crank lever for rocking the rear brake shoes, a connection between the pivoted handle and the bell crank lever, and a swiveled guide on the pivoted handle through which the said connection passes, whereby when the handle is rocked on its pivot, the front and rear brake shoes will be simultaneously applied to the wheels.

5. In combination, a truck including wheels, running gear, and a pivoted handle, brake shoes carried by the handle, resilient mountings for the brake shoes, and means connecting the resilient mounting and the truck for exerting a pull on the resilient mountings to cause the brake shoes to engage the wheels when the pivoted handle is rocked.

6. In combination, a truck including wheels, running gear, and a pivoted handle, a forwardly projecting flat leaf spring secured to the running gear, a flat leaf spring secured to the pivoted handle, brake shoes secured to the flat leaf spring, and a flexible connection between the two flat leaf springs, whereby when the handle is rocked on its pivot the brake shoes will be applied to the wheels.

7. In combination, a truck including wheels, and a pivoted handle, a flat leaf spring secured to the handle, shoes at the ends of the spring for engaging the periphery of the front wheels, and a cable having its ends connected to the leaf spring and passing through guides carried by the truck, substantially as shown and described.

8. In combination, a truck including wheels, running gear and a pivoted handle, a brake beam secured to the handle, shoes carried by the end of sad brake beam and engaging the periphery of the front wheels of the truck, cables connecting the beam with the running gear, certain of the said cables extending rearwardly and below the plan of the beam, a flat-spring secured to said cable, the other cable extending upwardly and rearwardly of said flat spring, guides for the said latter cables, said guides secured to the running gear whereby when the handle is raised or lowered the brake shoe will be applied.

9. In combination, a truck including a platform, front and rear wheels, running gear and pivoted handle, a transversely mounted flat-leaf spring secured to the pivoted handles, shoes on the ends of the flat-leaf spring, a flexible connection between the flat-leaf spring and the running gear, brake shoes for the rear wheels, a bell crank for rocking the rear brake shoes, a connection between the pivoted handle and the bell crank, and a guide on the pivoted handle through which the said connection passes, whereby when the handle is rocked on its pivot the front and rear brake shoes will be simultaneously applied to the wheels.

10. In combination, a truck including wheels, running gear and pivoted handle, flat-leaf spring secured to the handle, shoes carried by the ends of the flat-leaf spring and adapted to engage the periphery of the front wheels of the truck, cables connecting the flat-leaf spring to the running gear above and below the pivoted connection of the handle, whereby the upward or downward movement of the handle will draw the leaf spring inwardly to spring the shoes against the periphery of the wheels, substantially as shown and described.

11. In combination, a truck including the wheels, running gear and a pivoted handle, a flat-leaf spring secured to the handle, shoes carried by the end of the flat-leaf spring and adapted to engage the periphery of the front wheels, cables secured to the leaf-spring and having their inner ends secured to the running gear above and below the pivotal connection of the handle, brake shoes for the rear wheels, and a flexible connection between the brake shoes of the rear wall and handle, whereby the movement of the handle applies the brake shoes on the forward and rear wheels.

In testimony whereof I hereunto affix my signature in the presence of two witnesses.

FRANK N. ROBINSON.

Witnesses:
 JNO. IMRIE,
 W. N. WOODSON.

---

Copies of this patent may be obtained for five cents each, by addressing the "Commissioner of Patents, Washington, D. C."